US005084241A

United States Patent [19]

Parker

[11] Patent Number: 5,084,241

[45] Date of Patent: Jan. 28, 1992

[54] APPARATUS INCLUDING A SAMPLE PETTER TUBE FOR OBTAINING REPRODUCIBLE LIQUID SAMPLES OF SMALL VOLUME

[75] Inventor: James E. Parker, Long Beach, Calif.

[73] Assignee: V-Tech, Inc., Pomona, Calif.

[21] Appl. No.: 470,892

[22] Filed: Jan. 26, 1990

Related U.S. Application Data

[63] Continuation of Ser. No. 931,670, Jan. 20, 1987, abandoned, which is a continuation of Ser. No. 515,555, Jul. 19, 1983, abandoned, which is a continuation-in-part of Ser. No. 420,271, Sep. 20, 1982, abandoned.

[51] Int. Cl.[5] .................................. G01N 1/14

[52] U.S. Cl. .................................. 422/100; 73/864.01; 73/864.11; 73/864.14; 422/102; 422/103; 436/180

[58] Field of Search ................ 436/174, 180; 422/100, 422/102, 103, 104; 73/864.01, 864.11, 864.14, 864.15, 864.16, 864.24

[56] References Cited

U.S. PATENT DOCUMENTS 2,667,075 1/1954 Blum et al. .................... 422/100 X
3,321,087 5/1967 Fuge et al. .................. 73/864.01 X
3,937,370 2/1976 Witty .................................. 222/464
4,022,576 5/1977 Parker ............................ 422/100 X
4,308,028 12/1981 Elkins ............................ 422/100 X

FOREIGN PATENT DOCUMENTS 0464573 4/1937 United Kingdom ............ 73/864.01

*Primary Examiner*—Robert J. Hill, Jr.
*Attorney, Agent, or Firm*—Drucker & Sommers

[57] ABSTRACT

The disclosure teaches a pipette or petter tube and a system using the pipette to obtain reproducible liquid samples of known small volume. The pipette has an elongate body with one end adapted to be removably engaged by an aspiration device and the other end which is closed is adapted to contact a surface. The body has a spherical portion proximate the closed end. At least one aperture penetrates the wall of the spherical portion. When the petter tube is used in conjunction with a hollow tube having a known volume and of such size that the closed end of the pipette contacts the bottom of the tube a quantity of liquid can be aspirated from the tube leaving only a small predetermined volume behind.

6 Claims, 3 Drawing Sheets

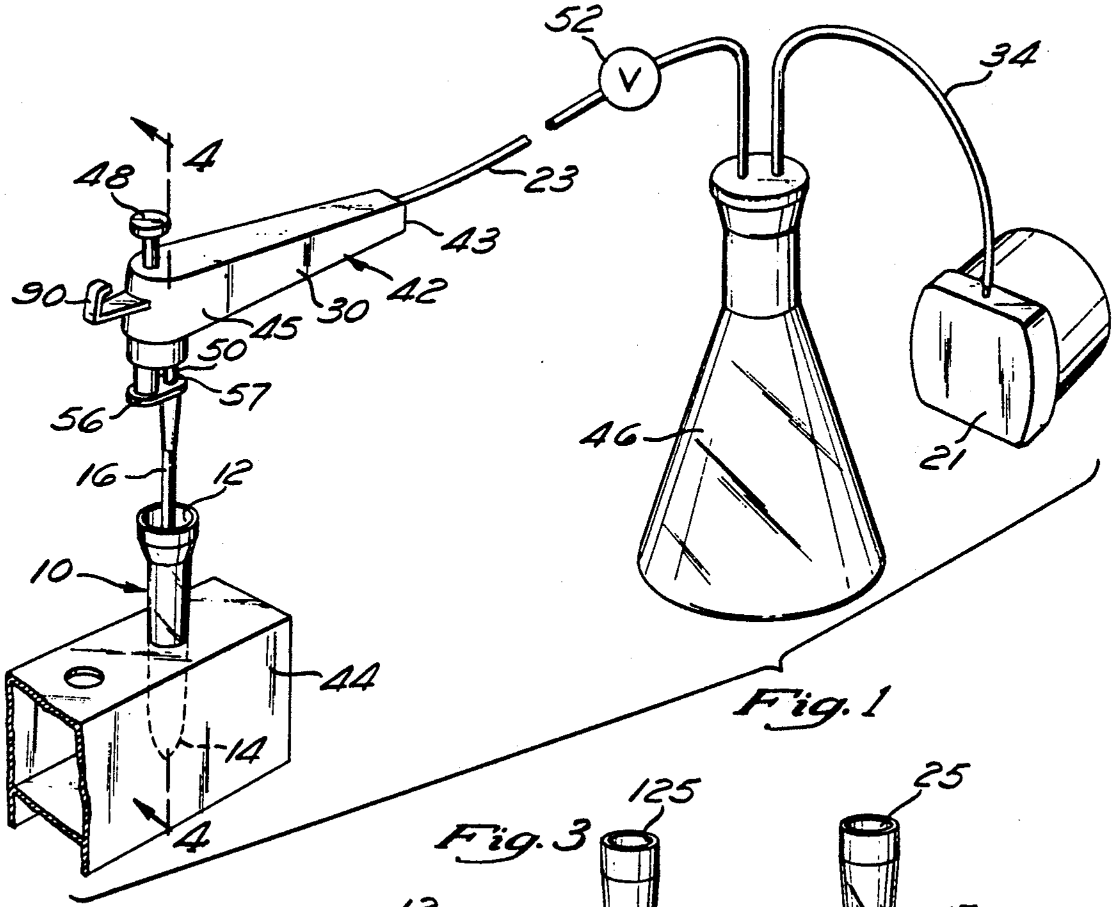
Fig. 1
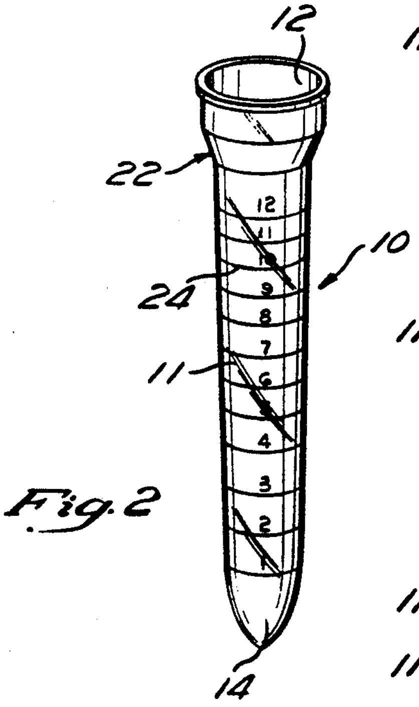
Fig. 2
Fig. 3
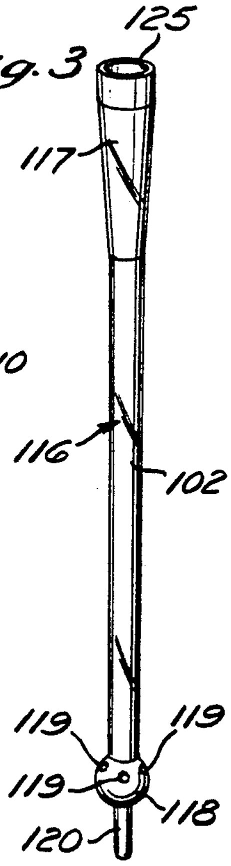
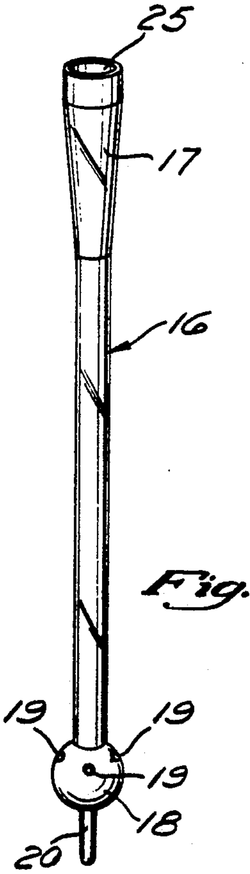
Fig. 7

Fig. 9
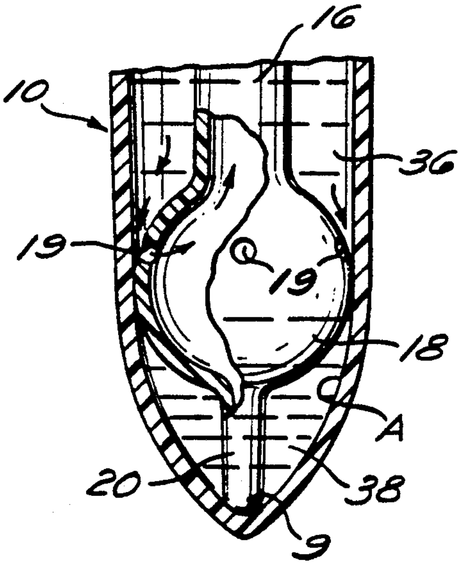
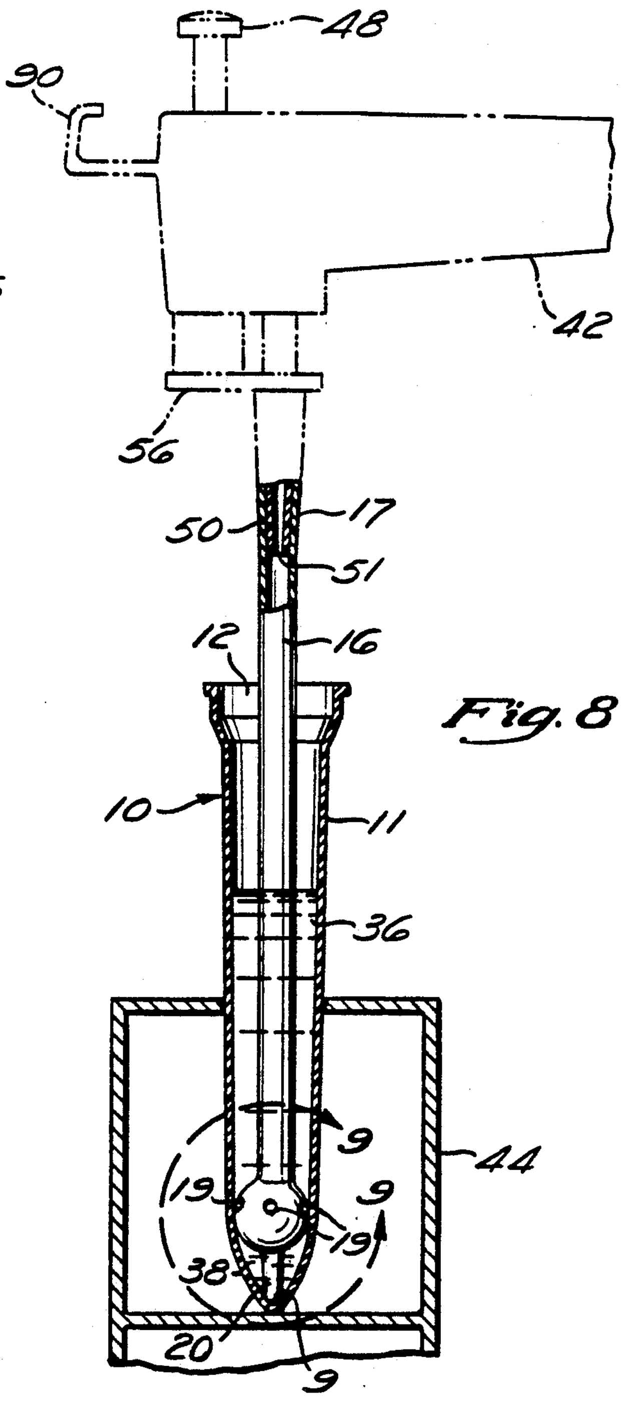
Fig. 8
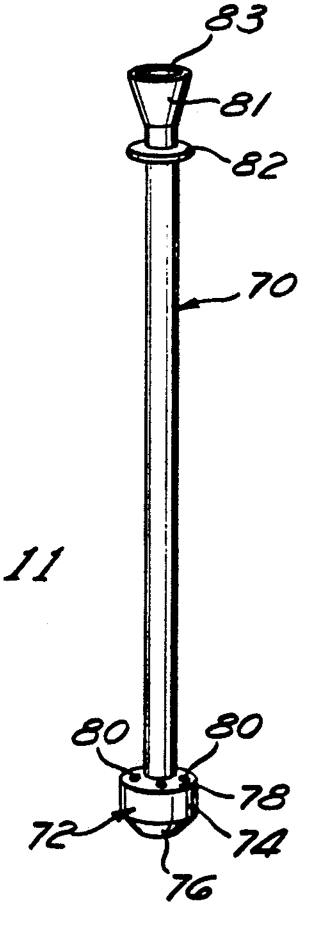
Fig. 11

APPARATUS INCLUDING A SAMPLE PETTER TUBE FOR OBTAINING REPRODUCIBLE LIQUID SAMPLES OF SMALL VOLUME

RELATED APPLICATIONS

This application is a continuation of application Ser. No. 931,670, filed Jan. 20, 1987, now abandoned, which is a continuation of application Ser. No. 515,555 filed July 19, 1983, now abandoned, which is a continuation-in-part of application Ser. No. 420,271 filed Sept. 20, 1982, now abandoned.

BACKGROUND OF THE INVENTION

This invention relates to an improved, semi-automatic laboratory method and apparatus, and more specifically to a method and apparatus for accurate, reproducible preparation of liquid-phase specimens and the like, for further chemical and microscopic analysis, e.g., urine samples.

The results of urinalysis provide a valuable tool for the diagnostician—as an aid in the determination of pathological conditions in the body, and in the detection of various diseases. The diagnostic procedures carried out in the performance of a urinalysis are well known and include the microscopic examination of a urine sample. The preparation of a standardized and reproducible urine sample for microscopic examination is important. In accordance with standard procedure, 12 ml of urine specimen are centrifuged for five minutes at 400 g, i.e., at 400 times the gravitational acceleration force. The sediment is thereby suspended in about 1 ml of the urine. This concentrated urine sediment is normally located in the lower 1 ml portion of the centrifuge tube. The upper 11 ml of sample is normally decanted or poured off and usually one drop of the remaining liquid containing suspended solids is taken for microscopic examination. This concentrated urine sediment is examined for cellular elements such as erythrocytes, leukocytes, epithelial cells, casts and crystals, the presence of which in more or less than predetermined amounts may be an indicator of particular human system malfunctions.

The accurate separation of the major supernatant liquid portion of the sample, herein referred to as the residue liquid, from the 1 ml sample portion containing the suspended solids (hereinafter sometimes referred to as the "liquid sample") is important in preparing the liquid sample for microscopic examination and is usually accomplished by simple decanting methods. However, if somewhat more or less than 11 ml is decanted after centrifuging, the remaining solids suspended in the separated portion of the urine will be abnormally diluted or concentrated, and the resulting examination may be inaccurate and not reproducible. Further, lack of care in the decanting technique may result in the loss of suspended solids, which will lead to inaccurate and unreproducible results.

The present invention provides an improved apparatus and method for a semi-automatic, preparation of an accurately and readily reproducible volume of sample liquid containing concentrated suspended material. As an improvement over the prior art, the present invention eliminates decanting, by manual methods, so that the danger of contamination of the operator by the residue liquid or inaccurate decanting of the sample is either eliminated or very substantially reduced. The method and apparatus thereby provides for uniformly prepared samples to achieve accurate and reproducible specimen volumes for microscopic examination.

The most pertinent prior art presently known is U.S. Pat. No. 4,022,576 issued to the present inventor, and to the patents cited therein, especially Farr, U.S. Pat. No. 3,481,477. The applicant is also aware of Farr U.S. Pat. No. 3,355,098. However, the method and apparatus of the applicant's former '576 patent requires manual decanting of residue liquid by the technician, followed by suctioning the concentrated portion of the specimen into the open lower end of the petter itself. The present invention eliminates the unsanitary and inaccurate manual decanting procedure, and leaves the concentrated specimen undisturbed in the test tube. Handling of the sample liquid by the technician is minimized. At no time need the technician manually touch the sample petter or come into contact with residue liquid as might be the case with manual decanting procedures. In accordance with the method of this invention, the sample container remains in a vertical position, usually in a test tube rack, throughout the preparation of the sample, thereby eliminating the danger of spillage.

The Farr patents relate to serum skimmers wherein the residue liquid is forced out of the collection tube by a piston-like device leaving the residue liquid or liquid sample in the collection tube. The piston-like device, called the serum skimmer, must be made to cricital tolerances, and is more time-consuming to utilize in that it requires the operator to use some care in obtaining an accurate and reproducible liquid sample volume.

The present invention provides an enhanced method and apparatus for sample preparation to achieve accurate and reproducible microscopic or chemical examination.

SUMMARY OF THE INVENTION

This invention provides an improved apparatus and semi-automatic method for the preparation of a sample of liquids, e.g., solutions, suspensions, and other liquid-phase media is described. The apparatus includes an elongated container, e.g., a test tube, an elongated tube of smaller diameter than the test tube with its lower end closed, herein referred to as the sample petter, and an aspirating or vacuum device. The sample petter has an enlarged hollow chamber near its closed lower end. In a first preferred embodiment, the sample petter tube is insertable in a test tube so that, when the closed lowermost end of the petter tube rests on the test tube bottom, the outer periphery of the enlarged hollow chamber does not sealingly engage the internal walls of the test tube but is only fairly closely spaced thereto, e.g. by 0.003" to 0.006". The hollow chamber has a fluid opening formed therein in fluid communication with the open upper end of the test tube, and excess sample in the test tube is readily aspirated from above the fluid opening when an aspirator device is connected to the open upper end of the petter tube to leave, intact, a desired predetermined, reproducible volume of sample liquid below the fluid opening. The sample petter tube is then readily withdrawn from the test tube because there is no sealing engagement of the petter walls with the internal walls of the test tube. Other embodiments of petter tubes are shown and described.

After the petter tube is withdrawn from the test tube, it is released from the aspirator device (in any of the embodiments by a remote push-button semi-automatic means provided in the aspirator device. In either case, no physical contact between the technician and the petter tube is required.

The present invention resides in an improved, semi-automatic method and apparatus for the preparation of liquid samples for examination of solids therein and other components thereof. By use of this invention, the collection of a reproducible volume of liquid sample is achieved in a more rapid and semi-automatic and more reliable manner than before.

Furthermore, since manual decanting techniques may be avoided, operation handling time is reduced, spillage is eliminated, and the obtaining of the liquid sample becomes a routine, quick and sanitary task. Suspended solids of a centrifuged sample are not disturbed by the manner of preparation since the liquid sample can remain relatively quiescent during removal of the supernatant residual liquid. Still further, the cost of the petter tubes may be substantially reduced since the dimensional tolerances are not critical.

The apparatus of the present invention comprises, in combination, various components. The first component is an elongated container open at its normally upper end, and closed at the opposite end, and is referred to herein as the test tube. The test tube is provided with indicia for accurately introducing a given amount of (unconcentrated) sample. Preferably, the closed end of the test tube is tapered or cone-shaped to facilitate the collection of suspended solids during centrifuging or the like.

The second component comprises a hollow elongated tube, open at its normally upper end and closed at its lower end. This tube, referred to herein as the sample petter or petter, has a main body narrower in diameter than the test tube and has a lower portion of enlarged cross-sectional area sometimes called hereinafter 'the petter chamber', the petter chamber being located near the closed lower end of the petter. The open upper end of the petter preferably has an increasing cross-sectional area to form a funnel shape to sealingly engage with a third component:the aspirator means. The petter chamber is in fluid communication with the open upper end of the petter.

The petter tube is freely received in the main body of the test tube, and as the lower end thereof seats on the bottom of the lower tapering test tube walls, the petter chamber is, in a first preferred embodiment, spaced from the inner walls of the test tube. The petter chamber has at least one fluid opening in communication with the open upper end of the petter tube. This fluid opening is spaced above the lower end of the test tube, to define, below the fluid opening, a predetermined sample liquid volume of, for example, 0.75 ml. Upon aspiration of the residue liquid in the test tube through the open upper end of the sample petter tube, it is found that all such liquid above the fluid opening is aspirated but the liquid remaining below the fluid opening remains intact and undisturbed and is not aspirated through the fluid opening. Thus, a predetermined volume of liquid sample is achieved, the volume of which depends upon the placement of the fluid opening with reference to the lower end of the test tube in which the petter tube is seated.

In the preferred embodiment, the peripheral walls of the hollow chamber of the petter tube are spaced from the inner tube walls by about 0.003" to 0.006" although a wider range is operative from about e.g. 0.003" to 0.015"—and it appears that, in such a case, there is no interference with the integrity of the desired predetermined sample volume below the fluid opening upon aspiration of the residue liquid.

In a second embodiment, the petter chamber is not undersized with respect to the inner test tube wall but sealingly engages this wall to define a sealed liquid sample volume. In this second embodiment, the petter chamber has a fluid opening just above the level of sealing engagement whereby the liquid sample volume is defined by the sealed volume, and the excess liquid is aspirated thereabove through the fluid opening and through upper end of the petter tube connected to the aspirator means.

In both embodiments the petter tubes, and test tubes are fabricated of relatively inexpensive moldable plastic material.

The third component, the aspiration device means or system completes the apparatus. In one preferred embodiment thereof, the aspirator means is a vacuum pump connected by flexible hosing to a waste receptacle, e.g., a flask, the waste receptacle being, in turn, connected, by flexible or rigid tubing, to an aspirator device (sometimes referred to herein as the aspirator gun) which sealably engages to the upper end of the sample petter. Upon completion of the aspirating of the residue liquid, the aspirator gun ejects the sample petter for disposal without any manual manipulation, or physical contact between the technician and the petter and the gun is then available for attachment to the next sample petter. The aspiration device includes a valve means to activate or deactivate the aspiration device.

The method of this invention involves filling of a test tube with a liquid in large excess with respect to the liquid sample desired, then centrifuging, under standardized conditions, the sample to concentrate suspended solids in the lower portion of the test tube. Following the centrifugation, the petter tube, the open upper end of which is attached to the aspirator gun, is freely inserted into the test tube until its closed lower end rests on the bottom of the test tube. The aspirator means is then activated to remove the liquid in the test tube which lies above the fluid opening of the petter chamber. The liquid remaining below the fluid opening is not aspirated, and since the fluid opening is quite precisely and reproducibly located, an accurate, reproducible liquid sample volume is obtained. In the case where the petter chamber is undersized (the first embodiment) the predetermined sample volume will be that volume lying just below the fluid opening. In the case where the petter chamber sealingly engages the test tube walls, the defined sample volume will also be that volume just below the fluid opening of the petter chamber and is substantially equal to the volume of the defined sealed area.

After aspiration of all of the residue liquid is completed, the sample petter is removed from the test tube and ejected by the aspirator gun, and thereby disposed of. A sample of the remaining liquid concentrated in solids can then be stained, etc. and withdrawn from the test tube in a conventional manner, e.g. by a transfer pipette, for microscopic or other analysis of the solids or liquids contained therein.

Although the invention is described herein in connection with urinalysis, it will be appreciated that the invention is not so limited, and finds application in other procedures, for example, blood analysis and emulsion studies. The present invention is applicable wherever accurate and reproducible analysis of of liquids containing suspended particles, droplets and other liquid-phase systems is necessary.

Other aspects and advantages of the present invention will become apparent from the following more detailed description, taken in conjunction with the accompanying drawings.

BRIEF DESCRIPTION OF THE DRAWINGS

FIG. 1 is a perspective view of the components of the apparatus of this invention showing their use in combination, with each other;

FIG. 2 is a perspective view of a test tube, with the indicia shown thereon, used in combination with my invention;

FIG. 3 is a perspective view of a presently preferred embodiment of sample petter used in FIG. 1 embodiment of this invention;

FIG. 7 is a perspective view of a second embodiment of sample petter;

FIG. 8 is a cross-sectional view of a second embodiment of this invention showing the sample petter of FIG. 7 in a test tube, and communicating with the aspirating device of this invention;

FIG. 9 is an enlarged fragmentary detail of the lower end of FIG. 8, designated by the arrow 9—9, showing the sample petter in normal supported position in the test tube;

FIG. 11 is a perspective view of a third embodiment of sample petter.

DETAILED DESCRIPTION OF THE INVENTION

The Presently Preferred Embodiment

In the preparation of liquid-phase samples, such as urine samples for analysis, a measured volume of the sample, e.g. 12 ml, is centrifuged in order to concentrate the solids contained therein in a relatively small volume of liquid, typically 1 ml. In accordance with the present invention, and as shown in FIG. 1, the liquid sample is prepared in test tube 10, having an open upper end 12 and a closed lower end 14.

Figure 4:
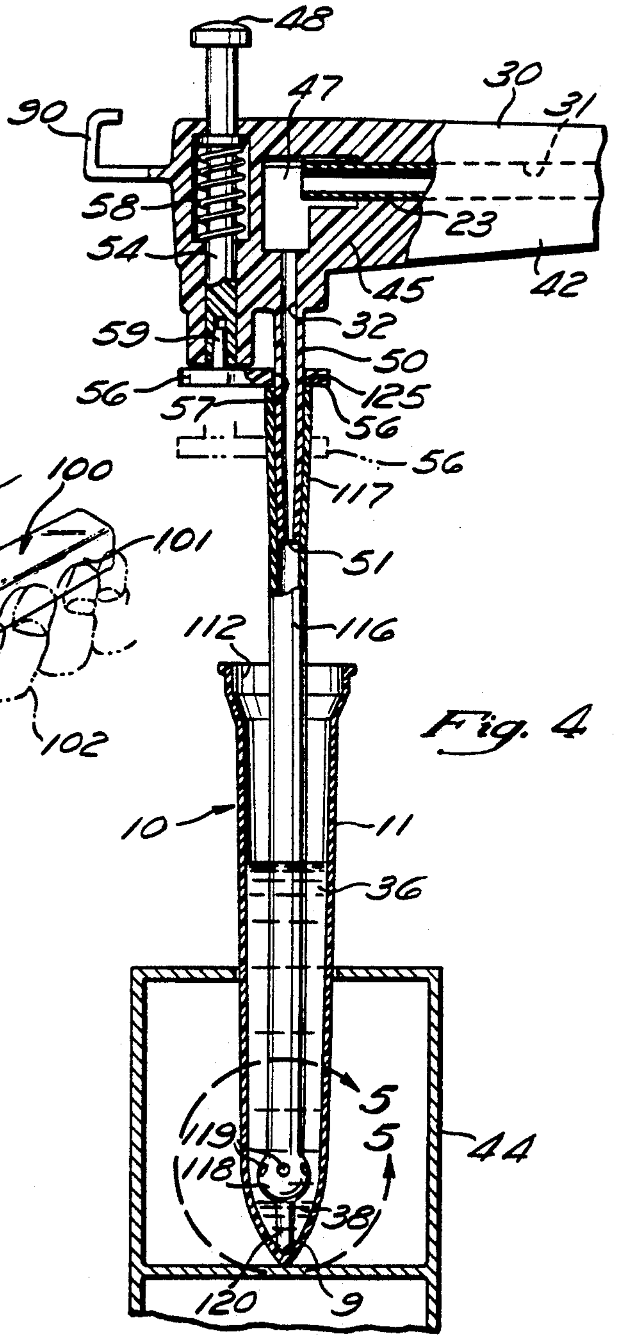
FIG. 4 is an enlarged fragmentary cross-sectional view taken along the line 4—4 of FIG. 1 showing the sample petter of FIG. 3 in a test tube, and communicating with the aspirating device of this invention.
Figure 5:
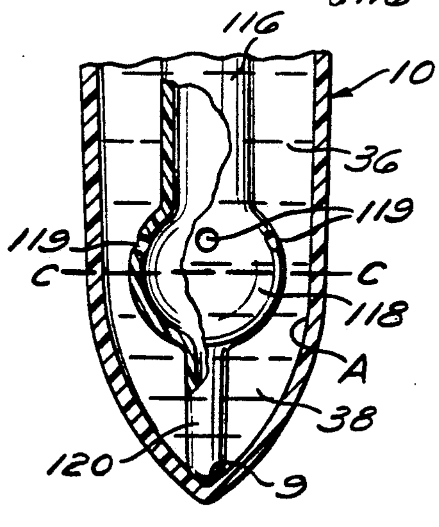
FIG. 5 is an enlarged fragmentary detail of the lower end of FIG. 4, designated by the arcuate arrow 5—5 showing the sample petter in position in the test tube and depicting the direction of flow for the residue liquid during aspiration.

In order to obtain a reproducible liquid sample volume of, for example, 0.75 ml. to 0.1 ml. in the test tube, a petter tube 116 is employed as specifically shown in FIGS. 3–5, petter tube 116 being the primary and presently preferred embodiment of this invention. Referring particularly to FIG. 3 it may be seen that the petter tube 116 comprises a generally tubular main body portion 102, an upwardly, outwardly tapering funnel-shaped open upper end 117, a closed lower end 120 in the form of a generally cylindrical stem of small diameter relative to the main body portion 102, and an enlarged hollow chamber 118 located at a finite distance, e.g. 8–12 mm. above the closed lower end 120 of the petter tube. The chamber 118 is enlarged with respect to the main body portion 102, and is, preferably, generally spherical in configuration. The sample petter is readily blow-molded from any one of a number of different plastic materials, such as low density polyethylene, polypropylene or polystyrene.

Referring to FIG. 4 the sample petter 116 is freely insertable into the main body 11 of the test tube 10 until the petter tube stem 120 abuts the bottom area 9 of test tube 10. In this position, the outer diameter of the hollow chamber 118 is spaced from the inner walls of the test tube 10 a distance of preferably between about 0.003" to about 0.006" as shown (in exaggerated form) in FIGS. 4–5A, although a wider spacing of up to as much as 0.015" may be employed depending upon factors such as the substance to be tested, and the materials of the test tube and the petter tube.

At least one fluid opening, or orifice 119 is provided in the hollow chamber 118. The fluid openings 119 are in fluid communication, through the main body portion 102, with the open upper end 117 of the petter tube. The orifices 119 are preferably located just above the equator line of the spherical hollow chamber 118 for reasons which will be described. From the point of view of economy of manufacture, a single fluid opening 119 is presently preferred.

In a specific example of carrying out a urinalysis in accordance with the method of the present invention, the patient's urine specimen is collected, and the test tube 10 filled to the 12 ml line. A physical examination of the urine is taken where color and appearance are recorded. Then, the specific gravity is determined and various chemical tests are performed on the urine. The next step requires the centrifugation of the test tube in a conventional manner. The test tube 10 containing liquid sample 38 and residue liquid 36 is then removed from the centrifuge and placed in a test tube rack 44 (FIGS. 1 and 4).

Figure 6:
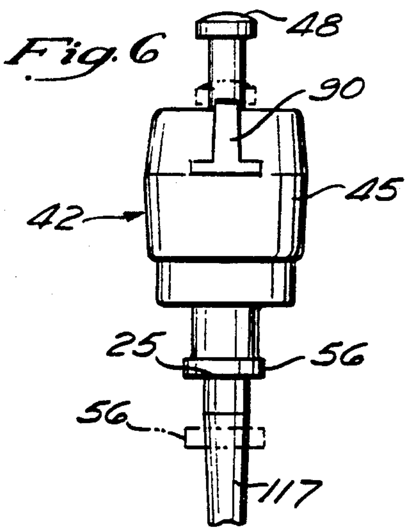
FIG. 6 is a partial end view of FIG. 4 showing the aspirator gun.

An unused petter 116 has its funnel-shaped upper end 117 attached to an aspirator device or gun, generally indicated by the numeral 42 (the details of which will be hereinafter described). The operator, holding the gun 42 with the attached petter 116, inserts the petter into the test tube 10, containing the centrifuged liquid sample 38 in the bottom and the residue liquid 36. The orifice(s) 119 of the hollow chamber 118 of petter 116 are located so that the volume defined below the orifice(s) 119, i.e. along line C-C of the test tube 10 in FIGS. 5 and 6, is equal to the desired volume of liquid sample which is to be retained in the test tube 10. Usually this liquid sample volume equals about 0.75 ml. to 0.1 ml.

As aspiration is initiated through the upper end 117 of the petter tube 116 by means of the aspiration gun 42, residue liquid 36 is first drawn through the petter tube, via orifices 119 in the direction indicated by the arrows in FIG. 5. Aspiration proceeds until the liquid level falls just below the orifices 119, i.e., along line C-C of the test tube 10 as shown in FIG. 5. The liquid sample 38 volume, retained after aspiration, is shown, in enlarged fashion, in FIG. 5.

The urine liquid sample 38 remaining in test tube 10 can now be stained and withdrawn for microscopic analysis, or transferred to another container, or mixed with another substance in the test tube, or stoppered and stored for further analysis.

Figure 5A:
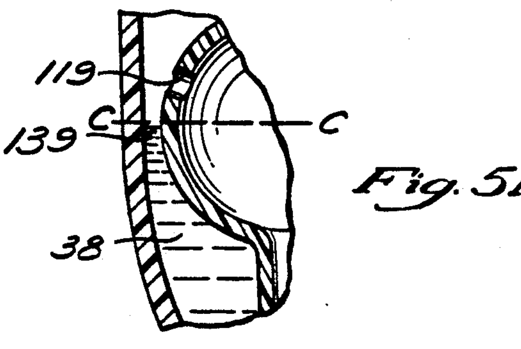
FIG. 5A is an enlarged fragmentary detail of the lower end of FIG. 4 as in FIG. 5, but showing the residue liquid level in the test tube after aspiration.

Applicant's parent application, Ser. No. 06/420,271, was premised on the concept that the liquid sample volume (that volume below line C-C) had to be sealed during aspiration in order to retain the integrity of the liquid sample volume. However, applicant has now found, completely unexpectedly, that the petter chamber 118 need not lie in sealing engagement with the inner walls of the test tube, along line C-C, but rather the petter chamber 118 should, optimally, be undersized with respect to the inner walls of test tube 10, along line C-C. It is found that, even though there is a clearance or spacing 139 (FIG. 5A) of about 0.003" to 0.006" along line C-C, and that there is no sealing engagement and/or physical contact, whatsoever, aspiration of the residue liquid 36 will only take place to the level of orifices 119, or perhaps, slightly therebelow as shown in FIG. 5A. Further aspiration of the liquid sample 38, below line C-C, does not take place, perhaps because of the capillary attraction of the remaining liquid in the test tube 10 to the test tube walls, and atmospheric pressure on the test tube. Forces such as these may be responsible for retaining the liquid sample 38 in place; but whatever the correct theory or hypotheses for the operation of the petter tube 116 relative to the test tube 10, in retaining a liquid sample volume just below the orifices 119, during aspiration, it is clear that the liquid sample volume 38 so produced is highly reproducible (within 5–10%). Variations in sample volume of 5–10% are usually considered as not significant.

The primary embodiment, shown in FIGS. 4–5A, is presently preferred because of substantial economics, both at the production level and at the operator (user) level. At the production level, because of the avoidance of the need of sealing engagement of petter chamber to the test tube inner wall, one need not be concerned about the maintenance of close tolerances of the petter chamber. This factor is of special importance because the petter is generally tubular in construction and is preferably blow-molded since that is the least costly mode of production. Dimensional tolerances are, however, difficult to maintain with blow-molded plastics. If a petter chamber is to be made with a 0.005" clearance and is "off" by even as much as 0.002", one need not be concerned since sealing engagement is not important, is not required, and is, in fact, to be avoided for the following reason.

The lack of sealing engagement is of great advantage in that the petter tube 116 can be readily released from the test tube 10 after aspiration is complete. If a sealing engagement is provided, the petter tube must be forcibly released from the test tube before it can be ejected from the aspirator gun 42. This step of forcible removal is time-consuming, as the operator must hold the test tube with one hand as he pulls the petter tube from the test tube. Such a time-consuming step is completely avoided by the use of the undersized petter tube 116. The use of undersized petter 116 is therefore of substantial advantage at the operator level.

The Aspiration System

The details of the aspiration system will now be set forth.

The upper end 117 of the sample petter tube 116 is sealingly engaged to a vacuum source 21, via an aspiration gun 42, flexible tube 23, valve 52 and waste disposal flask 46, and associated tubing 34 as shown in FIG. 1.

As shown in FIG. 4, the semi-automatic aspiration means or gun 42 is preferably molded of plastic material, such as ABS, and includes a preferably elongated housing 30 which functions as a handle for the gun 42. The housing 30 is provided with an elongated cylindrical bore 31 extending from the rear end 43 of gun 42 to a cavity 47 formed within the forward portion 45 of the housing 42. A second cylindrical bore 32 is provided within the forward portion 45 of the housing 30, the direction of which is at right angles to bore 31. The upper end of bore 32 terminates in cavity 47, and bores 31, 32 will be seen to be in fluid communication through cavity 47.

The bore 32 is provided with a substantially rigid downwardly tapering extension arm or tubular conduit 50 which functions as an attachment means to the funnel-shaped end 117 of sample petter 116. Affixed within bore 31 is tubing 23. As shown in FIG. 1, this tubing 23 extending rearwardly to waste flask 46 which is placed under vacuum by vacuum pump 21, via vacuum line 34, in a conventional manner. A conventional two-way valve 52 is placed in line 23 and controls the amount of vacuum desired, e.g. 8–10 psi, and thereby the rate of withdrawal of residue liquid, from the test tube 10.

It is to be noted that the funnel-shaped upper end 117 of petter tube 116 may be, and is, press-fitted onto the downwardly tapering extension arm 50 to enable fluid communication of sample petter 116 to the flask 46 via gun 42 and tubing 23.

After the residue liquid 36 has been aspirated into waste flask 46, and only the sample liquid 38 remains in the test tube 10, the sample petter 116 is withdrawn from the test tube 10 by having the operator raise the aspirator gun 42 upwardly, with one hand, a sufficient height to clear the test tube 10 while manually retaining the test tube 10 in place with the other hand. The sample petter 16 is then ejected from gun 42 as will now be described.

Referring to FIG. 4, a tubular push rod or arm 54 is confined for reciprocal movement in the forward portion 45 of gun 42, the push rod 54 extending (normally) vertically therethrough. A pusher bar 56 is affixed to the projecting lower end of the push rod and a push button 48 is affixed to the upper end of push rod 54. The pusher bar 56 extends substantially at right angles to push rod 54, has an opening or hole 57 passing through at one side thereof, and has an upwardly extending, upwardly tapering, pin 59 provided at the other side thereof. The pusher bar 56 is assembled to the lower end of push rod 54, by press-fitting pin 59 into the hollow tubular, lower end of pusher rod 54 while hole 57 is aligned with, and moves upwardly, around the aspirator extension arm 50. In this manner, pusher bar 56 rides down or up on extension arm 50 as push rod 54 is depressed or released, respectively, by push button 48. Spring 58 biases push rod 54 and push button 48 to a normally uppermost position, as shown in FIG. 4.

The ejection of sample petter 116 from the aspirator extension arm 50 proceeds as follows: push button 48 is depressed, causing push rod 54 and push bar 56 to also be lowered and spring 58 to be compressed. Push bar 56 will then downwardly strike the upper edge 125 of petter 116, and overcome the press-fit sealing engagement between the petter 116 and aspirator extension arm 50, and thereby disengage or eject the petter 116 from the aspirator gun 42—to a waste disposal (not shown). The fully depressed position of push bar 56 (to cause ejection of petter 116) is shown by phantom line, in FIGS. 4 and 6.

Upon release of the downward force on push button 48, the push rod 54 and pusher bar 56 automatically return to the full line position shown in FIGS. 4 and 6, under the influence of the decompression of spring 58, in which position the lower tip 51 of the extension arm 50 is completely free of the pusher bar 56, and can rapidly and easily receive the upper flared end 117 of the next petter 116.

Additional Features

Figure 10:
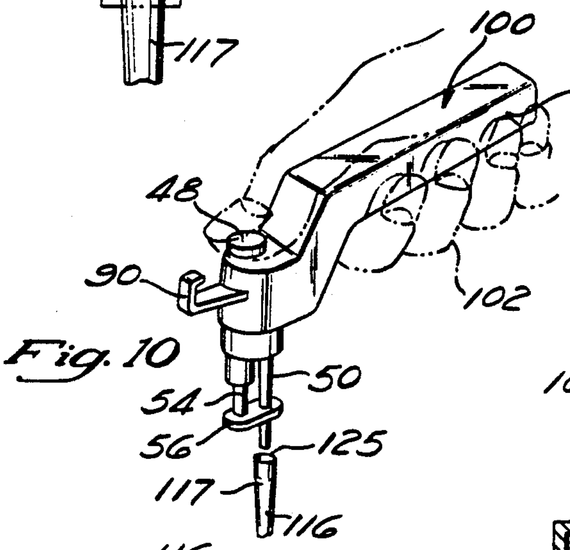
FIG. 10 is a perspective view showing a modification of the aspirator gun of FIG. 1.

In FIG. 10, an aspirator gun 100 is shown, which differs from the gun 42, in having the major trailing portion of its body 101, around which the user's fingers are placed, more remote from the upper end of the petter tube 116 than in the FIG. 1 aspirator gun 42. The remaining parts of the aspirator gun 42 and 100 are essentially the same.

A hook member 90 is affixed to the forward portion 45 of the housing 30 for the purpose of hanging the gun 100 into a suitable support member when not in use (not shown).

It is to be noted that the position of the placement of orifices 119 in the chamber 118 determines the amount of residue liquid which will be aspirated from petter tube 116. As a corollary, the placement of the orifices 119 on petter chamber 118 determines the volume of sample liquid 38 that will remain in test tube 10. The same petter mold, with different orifice placement, may be used to vary the volume of sample liquid 38 remaining in the test tube 10.

The lower end portion 14 of the test tube 10 is tapered radially inwardly in a direction toward the bottom area 9 of the test tube, to define a lower interior portion essentially of inverted cone shape. This configuration facilitates concentration of suspended solids by centrifuging. Additionally, the interior of test tube 10 within its lower end portion 14 is of reduced cross section with respect to the interior cross section adjacent the funnel shaped portion 22.

Since test tube 10 gradually decreases toward its closed end, a number of "liquid sample volume lines", selected at various points along the longitudinal axis of the same container, can be utilized with petter chambers 118 having different outer diameters, to form volumes of different sizes.

A suitable stopper or cap (not shown) can be provided to seal the open end 12 of the test tube 10 during centrifuging or the like. Volume indicia 24 are disposed along test tube 10 for indicating and measuring liquid volume.

The petter chamber 118 of petter 116 illustrated in FIGS. 4–5A is defined in this embodiment by a generally spherically shaped, hollow closed end with holes 119 located just above the equator of the spherical chamber to minimize blockage by sediment. The length of the integral plastic stem 120 below the chamber 118 may be varied to adjust the volume of liquid to be retained below chamber 118 and to positively space petter 116 and petter chamber 118 from the supporting bottom area 9 of test tube 10 in a reproducible manner.

The Second Embodiment (FIGS. 7–9)

In accordance with a second embodiment of the present invention, the liquid sample is prepared in test tube 10, having an open upper end 12 and a closed lower end 14, as before. A predetermined volume of the sample liquid is sealed in the closed end 14 of the test tube 10 by means of a sample petter tube 16. The sample petter tube 16 is freely insertable in the main body 11 of the test tube 10. The petter tube 16 is provided with a hollow, enlarged-diameter petter chamber 18 adjacent its lower end and an upwardly outwardly tapering, or funnel-shaped, upper end 17 having an upper edge 25. Petter chamber 18 forms a seal with the interior tapering lower wall area A of test tube 10 (but note that wall area A of the test tube in FIG. 5 is remote from the walls of petter chamber 118). Orifices 19 are provided in petter chamber 18 which enable the residue liquid 36 above the petter chamber 18 to be removed by aspiration, after which all or a portion of the remaining sealed sample liquid 38 in test tube 10 may be drawn for transfer to a microscope slide or other analytical instrument.

The upper end 17 of the sample petter 16 is sealingly engaged to a vacuum source 21, via an aspiration gun 42, flexible tube 23, valve 52 and waste disposal flask 46 as shown and described with reference to FIG. 1.

It is to be noted that the funnel-shaped upper end 17 of tube 16 is press-fitted onto the downwardly tapering extension arm 50 to enable fluid communication of sample petter 16 to the waste flask 46 via gun 42 and associated tubing.

After the residue liquid 36 has been aspirated into waste flask 46, and only the sample liquid 38 remains in the test tube 10, the sample petter 16 is withdrawn from the test tube 10 by holding the test tube 10 in place with one hand, while raising the aspirator gun 42 upwardly with the other a sufficient height to clear the test tube 10. The sample petter 16 is then ejected from gun 42 as has been earlier described.

The outer circumference of petter chamber 18 is selected to permit sufficient clearance between chamber 18 and the wall of test tube 10 so that petter 16 and chamber 18 are readily inserted through the upper end 12 of test tube 10, and can pass freely through the main body 11 of test tube 10 until further movement of chamber 18 toward closed end 14 is prevented by the bottoming of the stem 20 at the lower end of the test tube 10. At this point, the outer periphery of petter chamber 18 lies in sealing engagement with a portion of the inner wall of test tube 10, and that portion of test tube 10 between chamber 18 and bottom end 9 is sealed from the remainder of the test tube interior.

Petter chamber 18, when in sealing engagement with the inner wall of test tube 10, is spaced from bottom end 9 of test tube 10 so that a uniform, predetermined volume of sample liquid is contained within the sealed space beneath chamber 18. To this end, the outer diameter of chamber 18 is selected to correspond substantially to the internal diameter of test tube 10 at the point where the liquid sample volume level is defined. An internal annular shoulder or bead of appropriate size (not shown) may be provided in test tube 10 at the line of reduced cross section, to insure a perfect seal at the desired distance from the closed end of the test tube.

This embodiment assures a sealed, reproducible, volume of liquid sample 38 but has the disadvantages, with respect to the undersized petter tube 116, heretofore enumerated.

Another embodiment of the petter, designated by the numeral 70 is shown in FIG. 11. In FIG. 11, the chamber 72 is defined by a cylindrical wall 74, a lower end wall 76 of a truncated conical shape, and a flat upper wall 78, with holes 80 located on the flat upper wall. Petter 70 includes an open upper funnel-shaped end 81, and includes also an ejection shoulder 82. The pusher bar 56 of the aspirator gun 42 engages the ejection shoulder 82, for ejection of petter 70 following aspiration, instead of relying on the upper edge 83 of the petter 70 for engagement with pusher bar 56.

In this embodiment, the chamber 72 is preferably undersized, with respect to the test tube walls, in the manner set forth in FIGS. 4–5A and may also be employed with a larger petter chamber, as in FIGS. 7–9, so as to provide a sealed liquid sample volume in the test tube.

SUMMARY

In accordance with the foregoing, and especially the preferred embodiment, it can be seen that, in conducting examinations of solids suspended in liquids, the liquid sample is prepared conveniently, quickly and in a uniform manner. The invention substantially eliminates variations in the technique of preparation which can result in a disparity in results, even between samples of the same liquid. The present invention minimizes handling of the specimen, the danger of contamination by the technician by coming in contact with the specimen, and the danger of spillage. Uniform sample preparation is achieved even when semi-skilled persons are employed to prepare the samples.

The present invention allows the technician to prepare a substantially reproducible volume of urine or other liquid sample 38 in the test tube 10 (after centrifugation and placement in a test tube rack 44 or other means of support) without ever coming into contact with the liquid sample during the removal of the residue liquid 36, and without ever disturbing the vertical position of test tube 10 in preparing the specimen for analysis.

The apparatus of the present invention can be manufactured at relatively high production rates using inexpensive materials, and thus are particularly suited as single-use disposable items. The various embodiments of petters, herein described, can be conveniently fabricated by a blow-molding process using any number of suitable plastics.

While test tube 10 has been described as having a cone-shaped lower end portion 14, it will be appreciated that the precise configuration of the test tube container is not critical to the present invention.

It will also be appreciated that the present invention represents a substantial improvement in the field of laboratory analysis of liquids, such as urine, containing suspended materials. In particular, the invention provides a reliable, semi-automatic technique for isolating a predetermined volume of sample liquid for subsequent analysis. In terms of methodology, the steps, in combination, of a) filling the test tube with a large excess of liquid, and thereafter b) aspirating (i.e. removing by suction) some of that liquid down to a positive or finite level in the test tube as automatically determined by a suction-limiting means (such level corresponding to the predetermined volume of liquid sample desired) are believed to be novel and inventive.

Although specific embodiments of the invention have been described in detail for purposes of illustration, various modifications may be made without departing from the spirit and scope of the invention. Accordingly, the invention is not to be limited except by the appended claims.

I claim:

1. In an apparatus for preparing a liquid sample of reproducible, small volume comprising, in combination, a test tube having a bottom and an external aspirating means, the improvement wherein the apparatus further comprises:

a molded unitary sample petter tube comprising:

(a) a main body portion having an upper end open to the atmosphere and adapted to sealingly engage with said external aspirating means;

(b) a closed lower end having a pedestal base adapted to be supported by the bottom of said test tube;

(c) a substantially hollow spherical chamber proximate to said closed lower end, with external wall surfaces of said substantially hollow spherical chamber being spaced from internal wall surfaces of said test tube at its closest distance by about 0.003" to about 0.006" when said closed lower end is supported on the bottom of said test tube whereby said sample petter tube loosely fits within said test tube for ready insertion and removal therefrom; and (d) a fluid opening provided in said substantially hollow spherical chamber, said fluid opening being spaced from a lowermost extremity of said closed lower end by a finite distance and being in fluid communication with said open upper end of said sample petter tube, whereby when said closed lower end is supported on the bottom of said test tube and said external aspirating means is sealingly engaged to the open upper end of said sample petter tube, all liquid in the test tube above said fluid opening may be removed to leave a defined volume of liquid sample at the bottom of the test tube below the fluid opening.

2. The apparatus of claim 1 wherein the open upper end of said sample petter tube is outwardly flared in an upward direction.

3. The apparatus of claim 1 wherein said fluid opening in said substantially hollow spherical chamber is closely proximate to the equator of said substantially hollow spherical chamber.

4. The apparatus of claim 1 wherein said upper end of said sample petter tube is outwardly flared in an upward direction and said main body portion of said sample petter tube is elongated and generally tubular and lying in fluid communication with said substantially hollow spherical chamber, and said substantially hollow spherical chamber is enlarged with respect to the cross-sectional dimension of said main body portion.

5. The apparatus of claim 1 wherein said external aspirating means has attachment means for sealingly engaging with said open upper end of said sample petter tube and said attachment means has fluid communication means to a vacuum source.

6. The apparatus of claim 5 wherein said aspirating means further includes a reciprocally movable ejection means for disengaging said sample petter tube means from said attachment means and said ejection means is manually operable at a distance removed from said sample petter tube.

* * * * *